United States Patent
Tang

(10) Patent No.: US 11,139,871 B2
(45) Date of Patent: Oct. 5, 2021

(54) UPLINK SIGNAL TRANSMISSION METHOD AND RELATED DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 30 days.

(21) Appl. No.: 16/492,025

(22) PCT Filed: Mar. 14, 2017

(86) PCT No.: PCT/CN2017/076676
§ 371 (c)(1),
(2) Date: Sep. 6, 2019

(87) PCT Pub. No.: WO2018/165873
PCT Pub. Date: Sep. 20, 2018

(65) Prior Publication Data
US 2020/0358494 A1    Nov. 12, 2020

(51) Int. Cl.
H04B 7/02       (2018.01)
H04B 7/0456     (2017.01)
H04W 72/04      (2009.01)
H04L 7/00       (2006.01)

(52) U.S. Cl.
CPC ......... H04B 7/0469 (2013.01); H04B 7/0473 (2013.01); H04B 7/0482 (2013.01); H04W 72/042 (2013.01); H04W 72/0413 (2013.01)

(58) Field of Classification Search
CPC .. H04B 7/0469; H04B 7/0473; H04B 7/0482; H04B 7/0626; H04B 7/0456; H04B 7/0639; H04W 72/0413; H04W 72/042
USPC .................. 375/267, 299, 358; 455/101, 132
See application file for complete search history.

(56) References Cited

U.S. PATENT DOCUMENTS

| | | | |
|---|---|---|---|
| 2014/0205038 A1* | 7/2014 | Nakamura | H04L 25/0391 375/267 |
| 2016/0173250 A1 | 6/2016 | Kang et al. | |
| 2017/0195017 A1 | 7/2017 | Kim et al. | |
| 2018/0083681 A1* | 3/2018 | Faxer | H04B 7/0626 |
| 2018/0115357 A1* | 4/2018 | Park | H04B 7/04 |

FOREIGN PATENT DOCUMENTS

| | | |
|---|---|---|
| CN | 103201962 | 7/2013 |
| CN | 105432025 | 3/2016 |
| CN | 106301506 | 1/2017 |
| JP | 2019537150 | 12/2019 |

(Continued)

OTHER PUBLICATIONS

WIPO, ISR for PCT/CN2017/076676, dated Aug. 30, 2017.

(Continued)

*Primary Examiner* — Tesfaldet Bocure
(74) *Attorney, Agent, or Firm* — Hodgson Russ LLP

(57) ABSTRACT

An uplink signal transmission method includes: determining, by a terminal device, a target codebook according to a number of antenna panels of the terminal device; and transmitting, by the terminal device, uplink signal by using a codeword in the target codebook.

13 Claims, 7 Drawing Sheets

(56) References Cited

FOREIGN PATENT DOCUMENTS

| JP | 2020507950 | 3/2020 |
|---|---|---|
| RU | 2488964 | 7/2013 |
| WO | 2016013882 | 1/2016 |
| WO | 2018127426 | 7/2018 |

OTHER PUBLICATIONS

Federal Institute of Industrial Property, Office Action for RU Application No. 2019131144/07, dated Jun. 19, 2020.
EPO, European Search Report for EP Application No. 17901005.3, dated Jun. 17, 2020.
LG Electronics, "Discussion on codebook based transmission for UL in NR", 3GPP Draft; R1-1702447, 3rd Generation Partnership Project (3GPP), Feb. 12, 2017.
Catt, "Further discussion on SRS transmission", 3GPP Draft; R1-1700234, 3rd Generation Partnership Project (3GPP), Jan. 16, 2017.
Catt et al., "WF on UL codebook," 3GPP TSG RAN WG1 Meeting #88, R1-1704022, Feb. 2017, 2 pages.
Nokia et al., "On the utilization of multi-panel arrays at the UE in UMa 30GHz," 3GPP TSG-RAN WG1 #88, R1-1703154, Feb. 2017, 12 pages.
Catt, "Further discussion on UL MIMO for NR MIMO," 3GPP TSG RAN WG1 Meeting #87, R1-1611379, Nov. 2016, 3 pages.
Intel Corporation, "Further discussion on NR Type I codebook design," 3GPP TSG-RAN WG1 NR Ad-Hoc meeting, R1-1700341, Jan. 2017, 9 pages.
ZTE, "Aspects of UL MIMO transmission," 3GPP TSG RAN WG1 NR Ad-Hoc Meeting, R1-1700118, Jan. 2017, 5 pages.
EPO, Office Action for EP Application No. 17901005.3, dated Feb. 12, 2020.
IPOS, Office Action for SG Application No. 11201908403W, dated Mar. 23, 2021.
IPIN, Office Action for IN Application No. 201917040036, dated Jan. 25, 2021.
EPO, Office Action for EP Application No. 17901005.3, dated Apr. 13, 2021.
JPO, Office Action for JP Application No. 2019-549443, dated Mar. 23, 2021.
Intel Corp., "On Codebook Based UL Subband Precoding," 3GPP TSG-RAN WG1 #88, R1-1702192, Feb. 2017, 3 pages.
KIPO, Office Action for KR Application No. 10-2019-7028832, dated Jul. 29, 2021.
Huawei, HiSilicon, "UL codebook design in NR", 3GPP TSG RAN WG1 NR Ad Hoc Meeting, R1-1700062, Jan. 2017.
TIPO, Office Action for the TW Application No. 107105088, dated Jun. 9, 2021.
CIPO, Office Action for the CA Application No. 3,056,153, dated Aug. 18, 2021.

\* cited by examiner

UPLINK SIGNAL TRANSMISSION METHOD AND RELATED DEVICE

CROSS-REFERENCE TO RELATED APPLICATION

This application is a U.S. national phase application of International Application No. PCT/CN2017/076676, filed Mar. 14, 2017, the entire disclosure of which is incorporated herein by reference.

TECHNICAL FIELD

The present application relates to the field of communications, and more particularly, to an uplink signal transmission method and related device.

BACKGROUND

In the 5-Generation (5G) system, one or more antenna panels may be used by the terminal device to transmit uplink signals. The larger the number of antenna panels, the larger the total number of antennas, and the larger the required RF channel. A terminal device is usually provided with a certain number of antenna panels. If all antenna panels are used to transmit uplink signals at the same time, the total number of antennas corresponding to all antenna panels may be relatively large, and the terminal device may not have a corresponding number of radio frequency (RF) channels to satisfy the terminal device for using all antenna panels to transmit uplink signals at the same time. Therefore, how to select a part of the antenna panel from all the antenna panels to transmit the uplink signal is a technical problem to be solved.

SUMMARY

Embodiments of the disclosure provide an uplink signal transmission method and a related device, which are used to select an antenna panel for transmitting uplink signal.

According to a first aspect of embodiments of the disclosure, there is provided an uplink signal transmission method, including: determining, by a terminal device, a target codebook according to a number of antenna panels of the terminal device; and transmitting, by the terminal device, uplink signal by using a codeword in the target codebook. Thus, a part of the antenna panel can be flexibly selected from all the antenna panels to transmit the uplink signal in the embodiment.

According to a second aspect of embodiments of the disclosure, there is provided an uplink signal transmission method, including: sending, by a terminal device, uplink signaling to a network device, the uplink signaling carrying a number of antenna panels of the terminal device; receiving, by the terminal device, antenna panel indication information sent by the network device; and determining, by the terminal device, a target antenna panel for transmitting uplink signal from an antenna panel of the terminal device according to the antenna panel indication information, and transmitting the uplink signal by using the target antenna panel. Thus, a part of the antenna panel can be flexibly selected from all the antenna panels to transmit the uplink signal in the embodiment.

According to a third aspect of embodiments of the disclosure, there is provided an uplink signal transmission method, including:

receiving, by a network device, uplink signaling sent by a terminal device, the uplink signaling carrying a number of antenna panels of the terminal device;

determining, by the network device, a target codebook according to the number of antenna panels of the terminal device; and sending, by the network device, precoding indication (PMI) information to the terminal device, the PMI information being used to instruct the terminal device to transmit uplink signal by using a codeword in the target codebook.

According to a fourth aspect of embodiments of the disclosure, there is provided an uplink signal transmission method, including:

receiving, by a network device, uplink signaling sent by a terminal device, the uplink signaling carrying a number of antenna panels of the terminal device; and sending, by the network device, antenna panel indication information to the terminal device, the antenna panel indication information being used to instruct the terminal device to determine, from antenna panels of the terminal device, a target antenna panel for transmitting uplink signal, and to transmit the uplink signal by using the target antenna panel.

According to a fifth aspect of embodiments of the disclosure, there is provided a terminal device, including a processor, a memory, a transceiver, and a bus;

the processor is in connection and communication with the memory and the transceiver through the bus;

the memory stores executable program instructions, the processor is configured to invoke the executable program instructions in the memory to perform the method as described in the first aspect of embodiments of the disclosure.

According to a sixth aspect of embodiments of the disclosure, there is provided a terminal device, including a processor, a memory, a transceiver, and a bus;

the processor is in connection and communication with the memory and the transceiver through the bus;

the memory stores executable program instructions, the processor is configured to invoke the executable program instructions in the memory to perform the method as described in the second aspect of embodiments of the disclosure.

According to a seventh aspect of embodiments of the disclosure, there is provided a network device, including a processor, a memory, a transceiver, and a bus;

the processor is in connection and communication with the memory and the transceiver through the bus;

the memory stores executable program instructions, the processor is configured to invoke the executable program instructions in the memory to perform the method as described in the third aspect of embodiments of the disclosure.

According to an eighth aspect of embodiments of the disclosure, there is provided a terminal device, including a processor, a memory, a transceiver, and a bus;

the processor is in connection and communication with the memory and the transceiver through the bus;

the memory stores executable program instructions, the processor is configured to invoke the executable program instructions in the memory to perform the method as described in the fourth aspect of embodiments of the disclosure.

According to a ninth aspect of the disclosure, there is provided a computer readable medium, being configured to store computer software instructions used by the terminal device in the fifth aspect of embodiments of the disclosure, and including a program designed for implementing the first aspect of embodiments of the disclosure.

According to a tenth aspect of the disclosure, there is provided a computer readable medium, being configured to store computer software instructions used by the terminal device in the sixth aspect of embodiments of the disclosure, and including a program designed for implementing the second aspect of embodiments of the disclosure.

According to an eleventh aspect of the disclosure, there is provided a computer readable medium, being configured to store computer software instructions used by the terminal device in the fifth aspect of embodiments of the disclosure, and including a program designed for implementing the third aspect of embodiments of the disclosure.

According to a twelfth aspect of the disclosure, there is provided a computer readable medium, being configured to store computer software instructions used by the terminal device in the fifth aspect of embodiments of the disclosure, and including a program designed for implementing the fourth aspect of embodiments of the disclosure.

According to a thirteenth aspect of the disclosure, there is provided a communication system, including the terminal device in the fifth aspect of embodiments of the disclosure and the network device in the seventh aspect of embodiments of the disclosure, or including the terminal device in the sixth aspect of embodiments of the disclosure and the network device in the eighth aspect of embodiments of the disclosure.

These and other aspects of the disclosure will be more apparent from the following description of the embodiments.

BRIEF DESCRIPTION OF THE DRAWINGS

In order to more clearly illustrate the embodiments of the disclosure or technical solutions in prior art, the drawings used in the embodiments or the description of prior art will be briefly described below. Obviously, the drawings in the following description are only certain embodiments of the disclosure, and other drawings can be obtained from those skilled in the art without any creative work.

DETAILED DESCRIPTION

In order to make those skilled in the art better understand technical solutions provided by embodiments of the disclosure, the technical solutions are clearly and completely described in the following with reference to the accompanying drawings in the embodiments of the disclosure. Obviously, the embodiments as disclosed are only part of embodiments of the invention, but not all of the embodiments. All other embodiments obtained by those skilled in the art based on the embodiments of the disclosure without creative efforts shall fall within the scope of the invention.

Details are described below separately.

The terms "first", "second", "third", "fourth" and the like in the specification and claims of the disclosure are used to distinguish different objects, and are not intended to describe a specific order. Furthermore, the terms "comprises/includes", "comprising/including" and any modification thereof are intended to cover non-exclusive inclusion. For example, a process, method, system, product, or device that includes a series of steps or units is not limited to those listed steps or units, but optionally may also include steps or units not listed, or optionally may also include other steps or units inherent to these process, method, product or equipment.

References to "an embodiment(s)" herein mean that a particular feature, structure, or characteristic described in connection with the embodiment(s) may be included in at least one embodiment of the disclosure. The appearances of the phrase in various places of the specification are not necessarily referring to the same embodiment(s), and are not separate or optional embodiments that are mutually exclusive to another embodiment. It should be explicitly or implicitly understood by those skilled in the art that the embodiments described herein can be combined with other embodiments.

Embodiments of the disclosure will be described below with reference to the accompanying drawings.

Figure 1:
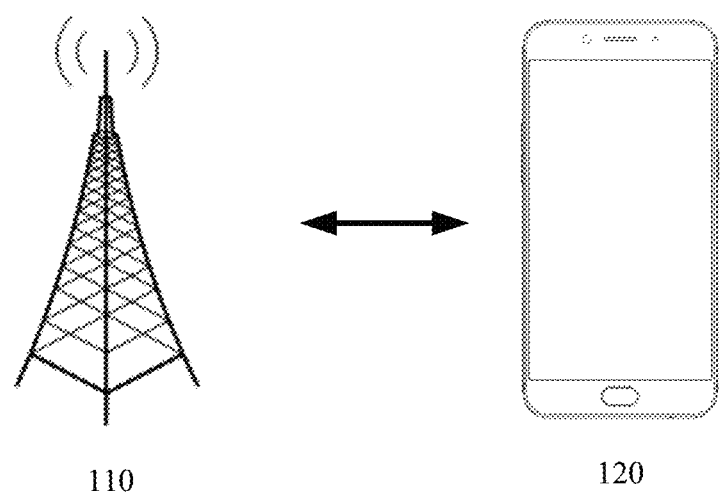
FIG. 1 is a schematic diagram illustrating a network architecture according to an embodiment of the disclosure.

Referring to FIG. 1, it is a schematic diagram illustrating a network architecture disclosed in an embodiment of the disclosure. The network architecture shown in FIG. 1 includes a network device 110 and a terminal device 120. The terminal device 120 determines a target codebook according to the number of antenna panels of the terminal device 120; and then transmits uplink signal to the network device 110 by using a codeword in the target codebook. Thus, part of antenna panels can be flexibly selected from all antenna panels of the terminal device 120 to transmit the uplink signal.

Optionally, in another embodiment, the terminal device 120 firstly sends uplink signaling to the network device 110, the uplink signaling carrying the number of antenna panels of the terminal device 120; then the network device 110 sends antenna panel indication information to the terminal device 120. After receiving the antenna panel indication information, the terminal device 120 determines a target antenna panel for transmitting uplink signal from antenna panels of the terminal device 120 according to the antenna panel indication information, and transmits the uplink signal to the network device 110 by using the target antenna panel. Thus, part of antenna panels can be flexibly selected from all antenna panels of the terminal device 120 to transmit the uplink signal.

In an embodiment, the network device 110 may refer to a node device at the network side. For example, the network device may be a radio access network (RAN) device at the access network side of the cellular network, and the so-called RAN device refers to a device connecting a terminal device to a wireless network. Such device may include but not limited to: an evolved Node B (eNB), a radio network controller (RNC), a Node B (NB), a base station controller (BSC), a base transceiver station (BTS), a home base station (e.g., a home evolved Node B or a Home Node B, HNB), a baseband unit (BBU). For another example, the network device may also be a node device in a wireless local area network (WLAN), such as an access controller (AC), a gateway, a WIFI access point (AP) or the like.

In an embodiment, the terminal device 120 may be also referred to as a user equipment (UE), which is a device that provides voice and/or data connectivity for a user, for example, a handheld device or an in-vehicle device with a wireless connection function. Conventional terminals include, for example, mobile phones, tablets, notebook computers, PDAs, mobile internet devices (MIDs), wearable devices such as smart watches, smart bracelets, pedometers, and the like.

The uplink signal transmission method provided by embodiments of the disclosure is described in detail below with reference to the network architecture shown in FIG. 1.

Figure 2:
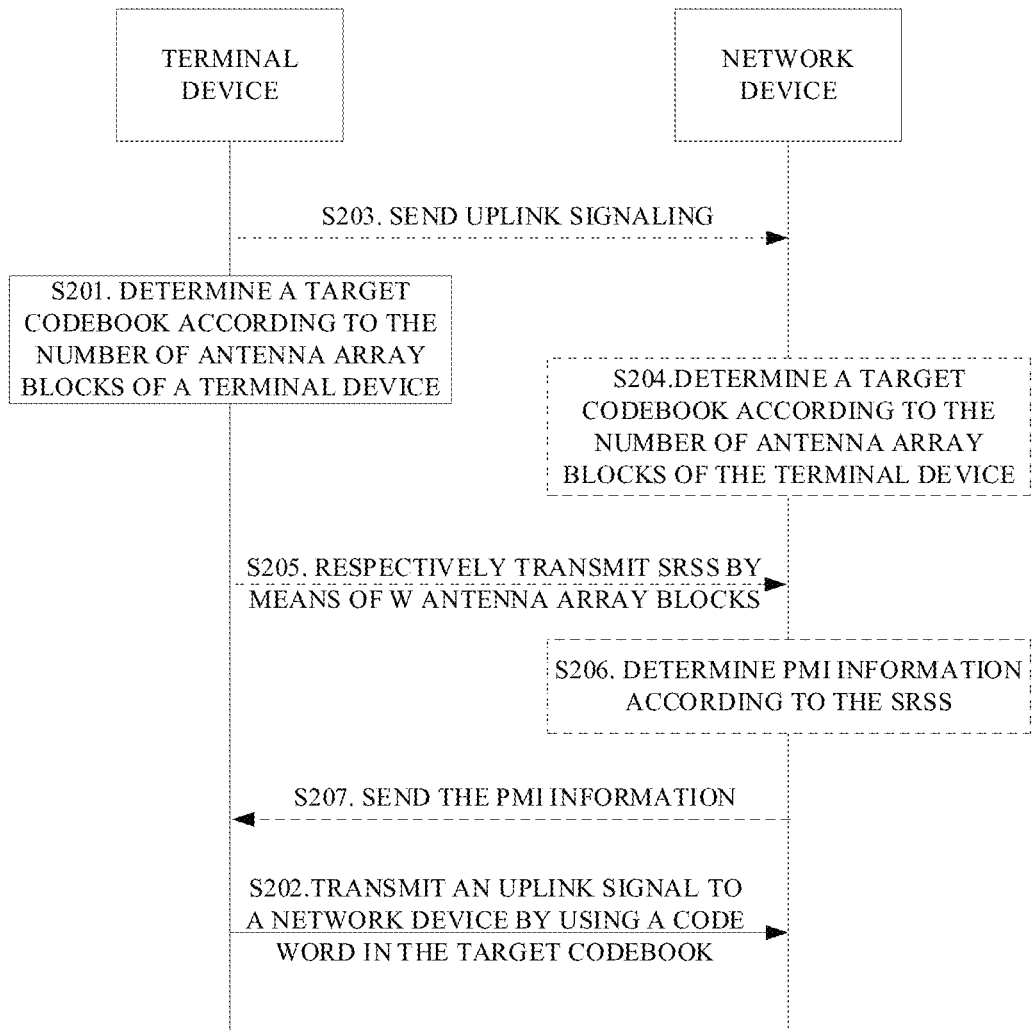
FIG. 2 is a schematic flowchart illustrating an uplink signal transmission method according to an embodiment of the disclosure.

Referring to FIG. 2, it is a schematic flowchart illustrating an uplink signal transmission method according to an embodiment of the disclosure, which includes the following steps.

In step S201, the terminal device determines a target codebook according to the number of antenna panels of the terminal device.

In an embodiment, before the step S201, the method further includes steps.

In step S203, the terminal device sends uplink signaling to the network device, the uplink signaling carrying the number of antenna panels of the terminal device.

In step S204, the network device receives the uplink signaling, and determines the target codebook according to the number of antenna panels of the terminal device.

In an embodiment, the foregoing signaling may include uplink high layer signaling, such as radio resource control (RRC) signaling and the like. The number of antenna panels of the terminal device is indicative of the number of all antenna panels of the current terminal device.

In an embodiment, the number of antenna panels of the terminal device is W, and the W is an integer greater than 1. The method further includes following steps.

In step S205, the terminal device transmits channel sounding reference signal (SRS) through the W antenna panels respectively.

In step S206, the network device receives the SRS transmitted by the terminal device through the W antenna panels respectively; and determines precoding indication (PMI) information according to the SRS.

In step S207, the network device sends the PMI information to the terminal device, the PMI information being used to indicate the terminal device to transmit uplink signal by using a codeword in the target codebook; then the terminal device receives the PMI information sent by the network device.

Specifically, the SRS is used as reference signal for uplink channel sounding. Since the terminal device transmits the SRS through the W antenna panels respectively, the network device receives W SRSs. The network device may learn transmission performance of the W antenna panels through the W SRSs, and then the network device may determine the indication information according to the transmission performance of the W antenna panels. Content of the indication information is used to indicate which codeword in the target codebook may be used by the terminal device to transmit the uplink signal. In an embodiment, each codeword in the target codebook corresponds to at least one antenna panel.

In an embodiment of forgoing step S205, the terminal device transmits SRS through the W antenna panels respectively may include: the terminal device transmits the SRS through the W antenna panels, respectively, at different time points.

Specifically, the terminal device transmits the SRS through the W antenna panels, respectively, at different time points may include: the terminal device transmits the SRS through the W antenna panels in turn. For example, the terminal device firstly transmits SRS through the first antenna panel, then transmits SRS through the second antenna panel, and then transmits SRS through the third antenna panel, and so on. Further, a difference between a time point when the SRS is transmitted by the first antenna panel and a time point when the SRS is transmitted through the second antenna panel may be equal to a preset time threshold, and a difference between the time point when the SRS is transmitted through the second antenna panel and a time point when the SRS is transmitted through the third antenna panel may be also equal to the preset time threshold. Optionally, the terminal device uses the first antenna panel to transmit the SRS for the first time, and uses the second antenna panel to transmit the SRS for the second time, and so on.

In an embodiment of forgoing step S205, the terminal device transmits SRS through the W antenna panels respectively may include: the terminal device transmits the SRS through the W antenna panels, respectively, at the same time point.

In an embodiment, M codebooks may be predetermined by the terminal device and the network device, each codebook corresponding to at least one number of antenna panels. In the embodiment, the terminal device or the network device determines the target codebook according to the number of antenna panels of the terminal device may include: the terminal device or the network device determines the target codebook corresponding to the number of antenna panels of the terminal device according to a mapping relationship between codebooks and numbers of antenna panels.

For example, the number of antenna panels of the terminal device may be 1, 2, 4, and corresponding codebooks may be predetermined for each of the 1, 2, and 4 antenna panels. 1 corresponds to the codebook 1, 2 corresponds to the codebook 2, 4 corresponds to the codebook 3. If the number of antenna panels is 4, then the target codebook is the codebook 3.

In an embodiment, a preset codebook may be predetermined by the terminal device and the network device. In the embodiment, the terminal device or the network device determines the target codebook according to the number of antenna panels of the terminal device may include: the terminal device or the network device determines the target codebook from the preset codebook according to the number of antenna panels of the terminal device.

Specifically, the preset codebook may be a codebook corresponding to the maximum number of antenna panels. For example, if the number of antenna panels is W, the number of antennas in one antenna panel or the number of radio frequency units in one antenna panel is N, then $K=W*N$ rows or $K=W*N$ columns may be obtained from the preset codebook as the target codebook.

In an embodiment, when the number of antenna panels of the terminal device is greater than 1, the target codebook may include an antenna panel selection codeword, and the antenna panel selection codeword is used for selecting the target antenna panel for transmitting the uplink signal.

In an embodiment, the antenna panel selection codeword may be a Kronecker product of an antenna panel selection vector and a precoding matrix within the antenna panel.

Specifically, the antenna panel selection codeword may be $X=Y_1 * Y_2$, where "*" refers to the Kronecker product. $Y_1$ is the antenna panel selection vector, which is a vector of W×1 dimension (multiple rows, 1 column). In $Y_1$, there are k elements with a value of 1, and W-k elements with a value of 0. In an embodiment, W is an integer greater than 1, which is the number of antenna panels reported by the terminal device, k is the number of target antenna panels (k is set by the network device), and k elements with the value of 1 correspond to selected k antenna panels. $Y_2$ is the precoding matrix within the antenna panel, which is a vector of N×r dimension, where N is the number of antennas in one antenna panel or the number of radio frequency units in one antenna panel, and r is the current number of transmission layers of the terminal device. In this method, data of all transmission layers may be transmitted by one antenna panel, and the same precoding matrix may be used in different target antenna panels.

In an embodiment, the antenna panel selection codeword is a vector matrix including precoding matrices corresponding to W antenna panels as row vectors, and the W is an integer greater than 1.

Specifically, the antenna panel selection codeword may be a vector matrix of $X=[Y_1, Y_2, \ldots, Y_W]^T$, where W is the number of antenna panels reported by the terminal device. In an embodiment, $Y_1$ is the precoding matrix corresponding to the i-th antenna panel, i is any number from 1 to W, and k matrices in $Y_1$-$Y_W$ are non-zero matrices, remaining matrices are all-zero matrices, and k is the number of target antenna panels (k is set by the network device). In an embodiment, the k non-zero matrices correspond to selected k antenna panels.

In an embodiment, the antenna panel selection codeword is a vector matrix including L precoding vectors as column vectors, and L is an integer greater than 1. In an embodiment, the i-th column vector in the vector matrix is a Kronecker product of an antenna panel selection vector and a precoding vector used by an antenna panel for transmitting data of the i-th transmission layer, the i is any number from 1 to L. In an embodiment, L is the total number of current transmission layers of the terminal device, or the maximum number of transmission layers allowed by the terminal device.

Specifically, the i-th column vector in the vector matrix is $Y_i=y_1 * y_2$, where "*" refers to the Kronecker product. $y_1$ is the antenna panel selection vector, which is a vector of W×1 dimension. In $y_1$, there are w elements with a value of 1, and remaining elements with a value of 0. In an embodiment, W is the number of antenna panels reported by the terminal device, w is the number of antenna panels transmitting data of the i-th transmission layer, and the w elements with value of 1 correspond to selected w antenna panels. For example, the value of w is 1, indicating that each data stream is transmitted via only one antenna panel. $y_2$ is the precoding matrix used by the antenna panel for transmitting data of the i-th transmission layer, which is a vector of N×1 dimension, where N is the number of antennas in one antenna panel or the number of radio frequency units in one antenna panel. In this method, data of different transmission layers may be transmitted via different antenna panels.

Figure 3:
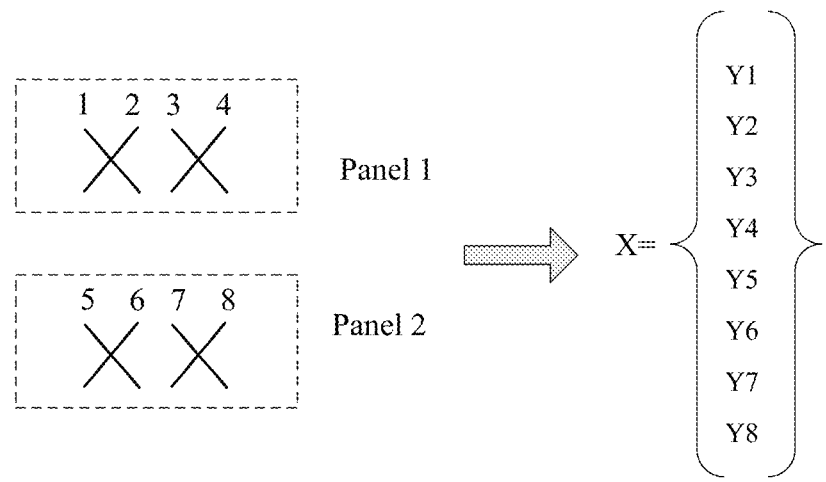
FIG. 3 is a schematic flowchart illustrating an uplink signal transmission method according to another embodiment of the disclosure.
Figure 4:
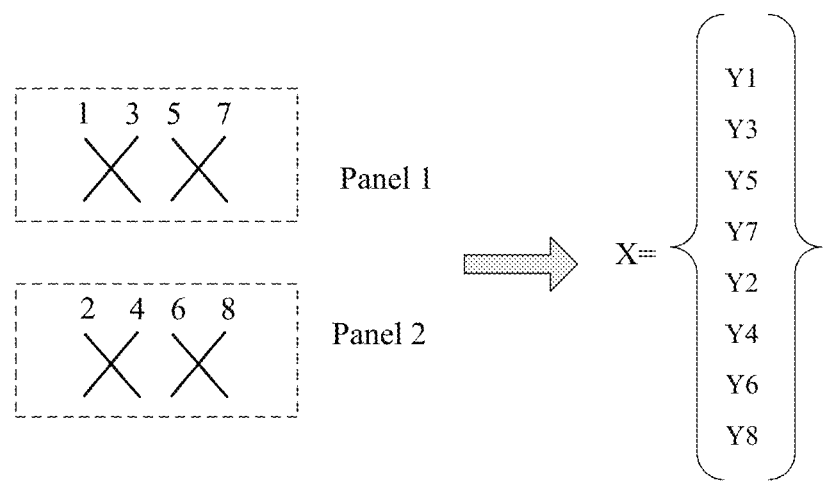
FIG. 4 is a schematic diagram illustrating antenna-panel-based antenna numbering and a corresponding precoding matrix according to an embodiment of the disclosure.

It should be noted that, in the above method, it is assumed that numbering sequence of antennas or radio frequency units of the terminal device is in the order of antenna panels one by one. For example, the terminal device is provided with two antenna panels, and each antenna panel has 4 antennas, then the serial numbers of antennas in the first antenna panel are 1, 2, 3, 4, and the serial numbers of antennas in the second antenna panel are 5, 6, 7, 8. If the terminal device adopts a different numbering manner, for example, numbered according to first horizontal direction and then vertical direction, or first vertical direction and then horizontal direction, the antenna panel selection codeword may be a matrix obtained by transforming X in the above method (i.e., positions of part of rows in X are switched), specifically, as shown in FIG. 3 and FIG. 4.

In step S202, the terminal device transmits uplink signal to the network device by using a codeword in the target codebook.

In an embodiment of the step S202, the terminal device transmits uplink signal to the network device by using a codeword in the target codebook may include: the terminal device determines a target codeword in the target codebook according to the PMI information; precodes the uplink signal based on the target codeword, and transmits the precoded uplink signal.

It should be noted that the number of the target antenna panel may be one or more, which is not limited in the disclosure.

Accordingly, in this solution, the target codebook is firstly determined by the terminal device according to the number of antenna panels of the terminal device; and then the codeword in the target codebook is used to transmit the uplink signal. Thus, part of antenna panels can be flexibly selected from all antenna panels to transmit uplink signal in this solution.

Figure 5:
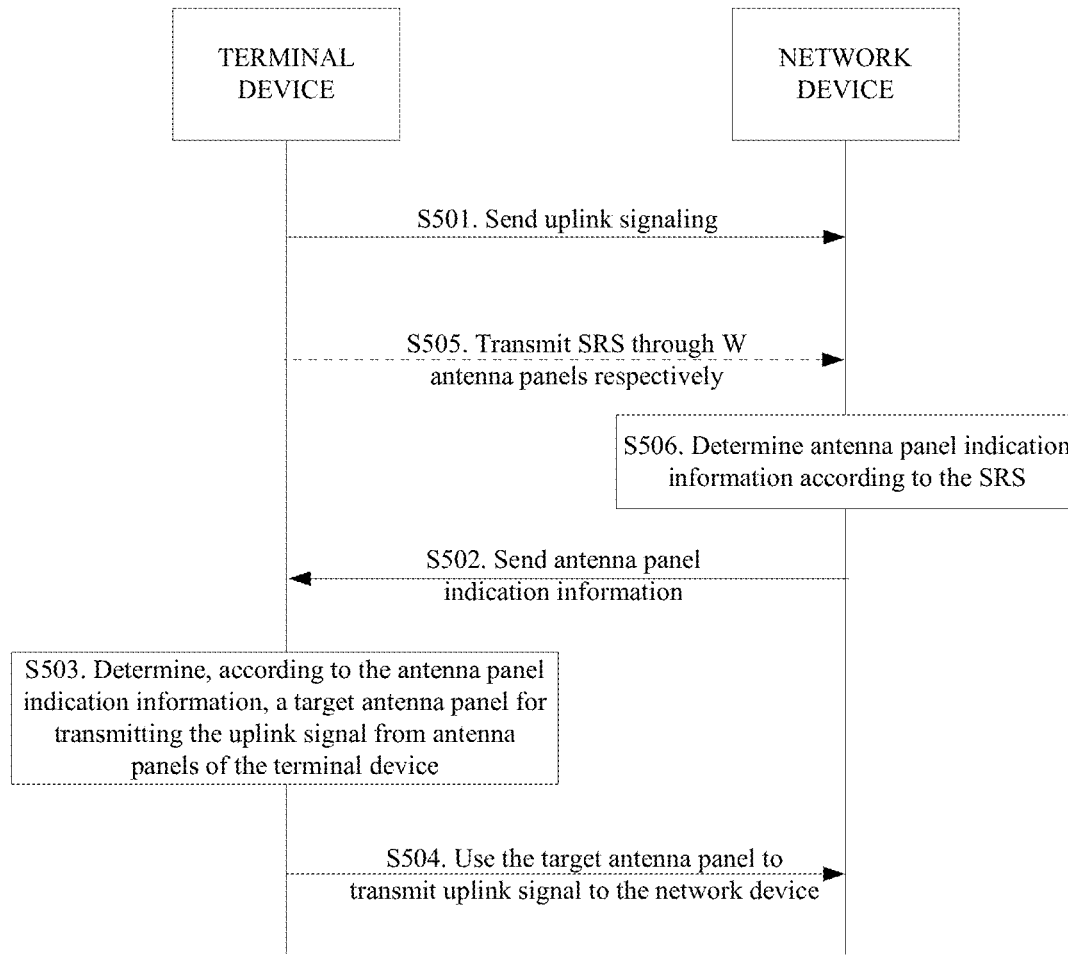
FIG. 5 is a schematic diagram illustrating column-first-row-later antenna numbering and a corresponding precoding matrix according to an embodiment of the disclosure.

Referring to FIG. 5, which is a schematic flowchart illustrating an uplink signal transmission method according to an embodiment of the disclosure, including the following steps.

In step S501, the terminal device sends uplink signaling to the network device, the uplink signaling carrying the number of antenna panels of the terminal device.

In an embodiment, the foregoing signaling may include uplink high layer signaling, such as radio resource control (RRC) signaling and the like. The number of antenna panels of the terminal device is indicative of the number of all antenna panels of the current terminal device.

In step S502, the network device receives the uplink signaling sent by the terminal device, and sends antenna panel indication information to the terminal device.

The number of bits of the indication information may be determined according to the maximum possible number of antenna panels of the terminal, or may be determined according to the number of antenna panels reported by the terminal. For example, if the maximum possible number of antenna panels of the terminal is H, the indication information of $\log_2 H$ (rounded up) bits may be used. Optionally, if the number of antenna panels reported by the terminal is W, the indication information of $\log_2 W$ (rounded up) bits may be used. In another embodiment, if the number of antenna panels reported by the terminal is W, W bits indication information may be used, and the target antenna panel may be indicated by using bitmap. In an embodiment, each bit of the W bits corresponds to one antenna panel, and a bit value of 1 indicates that the corresponding antenna panel is selected, and a bit value of 0 indicates that it is not selected.

In an embodiment, the network device sends the antenna panel indication information to the terminal device may include: the network device sends high layer signaling or downlink control information (DCI) for scheduling uplink signal transmission to the terminal device, and the high layer signaling or the DCI carries the antenna panel indication information.

In an embodiment, the number of the antenna panels of the terminal device is W, and W is an integer greater than 1. Before the network device sends the antenna panel indication information to the terminal device, the method may further include following steps.

In step S505, the terminal device transmits channel sounding reference signal (SRS) through the W antenna panels, respectively.

In step S506, the network device receives the SRS transmitted by the terminal device by using the W antenna panels respectively, and determines the antenna panel indication information according to the SRS.

Specifically, the SRS is used as reference signal for uplink channel sounding. Since the terminal device transmits the SRS through the W antenna panels respectively, the network device receives W SRSs. The network device may learn transmission performance of the W antenna panels through the W SRSs, and then the network device may determine the indication information according to the transmission performance of the W antenna panels. Content of the indication information is used to indicate which antenna panel with better performance may be used by the terminal device to transmit the uplink signal, so that transmission efficiency of uplink signal may be improved.

In an embodiment, the terminal device transmits SRS through the W antenna panels respectively may include: the terminal device transmits the SRS through the W antenna panels, respectively, at different time points.

Specifically, the terminal device transmits the SRS through the W antenna panels, respectively, at different time points may include: the terminal device transmits the SRS through the W antenna panels in turn. For example, the terminal device firstly transmits SRS through the first antenna panel, then transmits SRS through the second antenna panel, and then transmits SRS through the third antenna panel, and so on. Further, a difference between a time point when the SRS is transmitted by the first antenna panel and a time point when the SRS is transmitted through the second antenna panel may be equal to a preset time threshold, and a difference between the time point when the SRS is transmitted through the second antenna panel and a time point when the SRS is transmitted through the third antenna panel may be also equal to the preset time threshold. Optionally, the terminal device uses the first antenna panel to transmit the SRS for the first time, and uses the second antenna panel to transmit the SRS for the second time, and so on.

In an embodiment, the terminal device transmits SRS through the W antenna panels respectively may include: the terminal device transmits the SRS through the W antenna panels, respectively, at the same time point.

In step S503, the terminal device receives antenna panel indication information sent by the network device, and determines, according to the antenna panel indication information, a target antenna panel for transmitting the uplink signal from antenna panels of the terminal device.

In step S504, the terminal device uses the target antenna panel to transmit uplink signal to the network device.

It can be seen that, in the present solution, the terminal device can select the target antenna panel for transmitting uplink signal from antenna panels of the terminal device based on the indication information sent by the network device, and thus part of antenna panels can be flexibly selected from all antenna panels of the terminal device to transmit the uplink signal.

Figure 6:
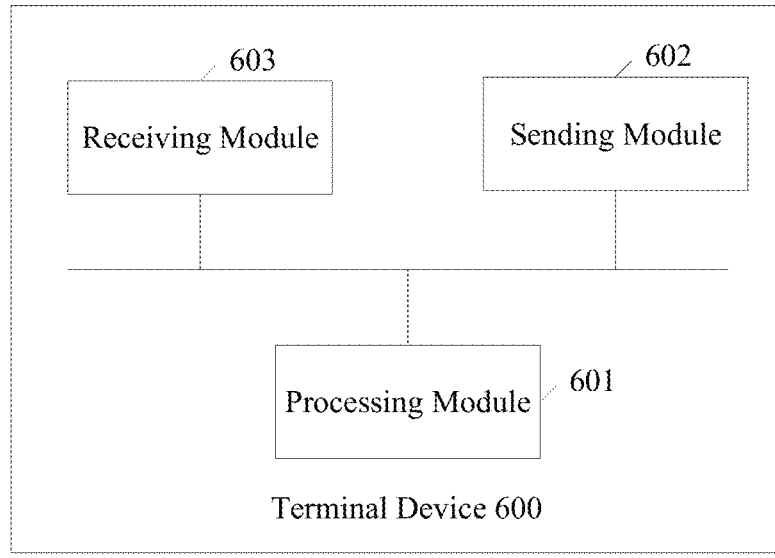
FIG. 6 is a block diagram illustrating a terminal device according to an embodiment of the disclosure.

Embodiments of the disclosure further provides a terminal device 600, as shown in FIG. 6, it may include a processing module 601.

The processing module 601 is configured to determine a target codebook according to a number of antenna panels of the terminal device; and transmit uplink signal by using a codeword in the target codebook.

In an embodiment, the terminal device further includes a sending module 602.

The sending module 602 is configured to send uplink signaling to a network device, the uplink signaling carrying the number of antenna panels of the terminal device, and the number of antenna panels of the terminal device being used by the network device to determine the target codebook.

In an embodiment, M codebooks are predetermined by the terminal device and the network device, each codebook corresponding to at least one number of antenna panels, and the processing module 601 is specifically configured to:

determine the target codebook corresponding to the number of antenna panels of the terminal device according to a mapping relationship between codebooks and numbers of antenna panels.

In an embodiment, a preset codebook is predetermined by the terminal device and the network device, the processing module 601 is specifically configured to:

determine the target codebook from the preset codebook according to the number of antenna panels of the terminal device.

In an embodiment, when the number of antenna panels of the terminal device is greater than 1, the target codebook comprises an antenna panel selection codeword, the antenna panel selection codeword being used to select a target antenna panel for transmitting the uplink signal.

In an embodiment, the antenna panel selection codeword is a Kronecker product of an antenna panel selection vector and a precoding matrix within the antenna panel.

In an embodiment, the antenna panel selection codeword is a vector matrix comprising precoding matrices corresponding to W antenna panels as row vectors, W being an integer greater than 1.

In an embodiment, the antenna panel selection codeword is a vector matrix comprising L precoding vectors as column vectors, L being an integer greater than 1; and i-th column vector in the vector matrix is a Kronecker product of an antenna panel selection vector and a precoding vector used by an antenna panel for transmitting data of an i-th transmission layer, i being any number from 1 to L.

In an embodiment, the terminal device further includes a receiving module 603.

The receiving module 603 is configured to receive precoding indication (PMI) information sent by a network device;

and the processing module is specifically configured to determine a target codeword in the target codebook according to the PMI information; precode the uplink signal based on the target codeword, and transmit the precoded uplink signal.

In an embodiment, the number of antenna panels of the terminal device is W, W being an integer greater than 1, and the sending module 602 is further configured to transmit channel sounding reference signal (SRS) through the W antenna panels respectively, the SRS being used by the network device to determine the PMI information.

In an embodiment, the sending module 602 is specifically configured to:

transmit SRS through the W antenna panels, respectively, at different time points.

It should be noted that each of the above modules (the processing module 601, the sending module 602, and the receiving module 603) may be used to perform related steps of the forgoing method.

In the present embodiment, the terminal device 600 is presented in the form of modules. The term "module" herein may refer to an application-specific integrated circuit (ASIC), a processor that executes one or more software or firmware programs and memory, integrated logic circuits, and/or other devices that provide the forgoing functionality. In addition, the above processing module 601 may be implemented by the processor 1001 of the computer device shown in FIG. 10, and the sending module 602 and the receiving module 603 may be implemented by the transceiver 1003 of the computer device shown in FIG. 10.

Figure 7:
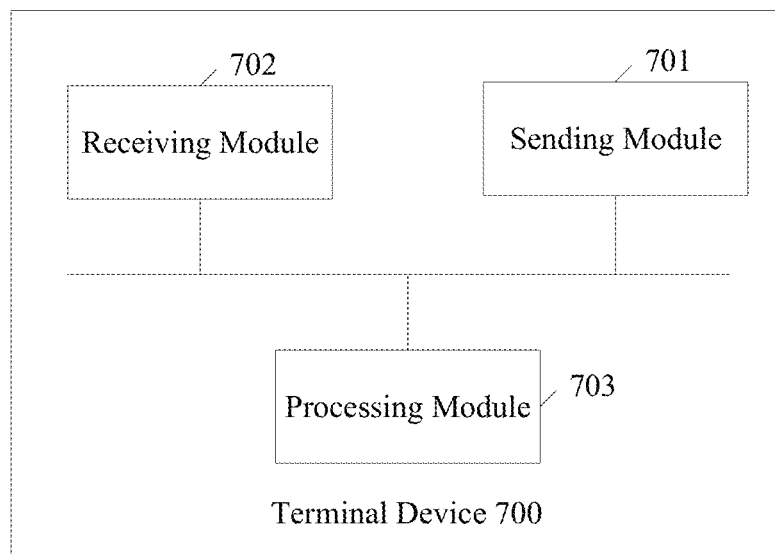
FIG. 7 is a block diagram illustrating a terminal device according to another embodiment of the disclosure.

Embodiments of the disclosure further provides a terminal device 700, as shown in FIG. 7, it may include a sending module 701, a receiving module 702 and a processing module 703.

The sending module 701 is configured to send uplink signaling to a network device, the uplink signaling carrying a number of antenna panels of the terminal device.

The receiving module 702 is configured to receive antenna panel indication information sent by the network device.

The processing module 703 is configured to determine a target antenna panel for transmitting uplink signal from an antenna panel of the terminal device according to the antenna panel indication information, and transmit the uplink signal by using the target antenna panel.

In an embodiment, the receiving module 702 is specifically configured to:

receive high layer signaling or downlink control information (DCI) for scheduling uplink signal transmission sent by the network device, the high layer signaling or the DCI carrying the antenna panel indication information.

In an embodiment, the number of antenna panels of the terminal device is W, W being an integer greater than 1, and the sending module 701 is further configured to transmit channel sounding reference signal (SRS) through the W antenna panels respectively, the SRS being used by the network device to determine the antenna panel indication information.

In an embodiment, the sending module 701 is specifically configured to transmit the SRS through the W antenna panels, respectively, at different time points.

It should be noted that each of the above modules (the sending module 701, the receiving module 702, and the processing module 703) may be used to perform related steps of the foregoing method.

In the present embodiment, the terminal device 700 is presented in the form of modules. The term "module" herein may refer to an application-specific integrated circuit (ASIC), a processor that executes one or more software or firmware programs and memory, integrated logic circuits, and/or other devices that provide the forgoing functionality. In addition, the above processing module 703 may be implemented by the processor 1001 of the computer device shown in FIG. 10, and the sending module 701 and the receiving module 702 may be implemented by the transceiver 1003 of the computer device shown in FIG. 10.

Figure 8:
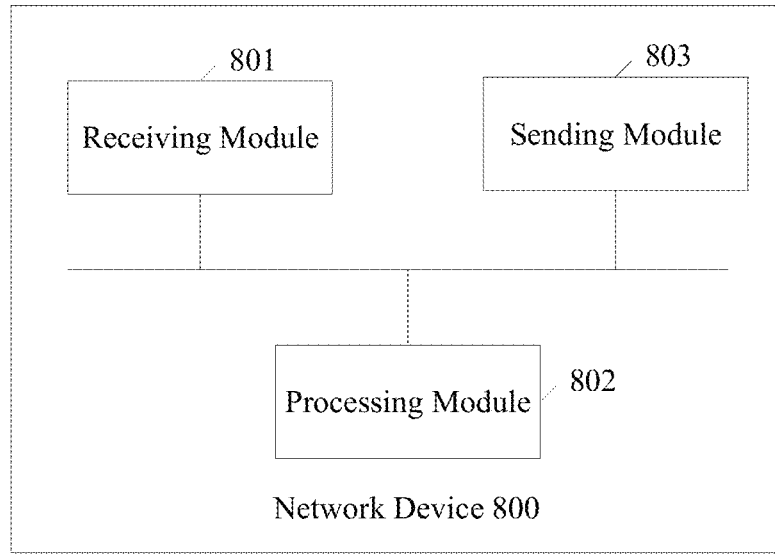
FIG. 8 is a block diagram illustrating a network device according to an embodiment of the disclosure.

Embodiments of the disclosure further provides a network device 800, as shown in FIG. 8, it may include a receiving module 801, a processing module 802 and a sending module 803.

The receiving module 801 is configured to receive uplink signaling sent by a terminal device, the uplink signaling carrying a number of antenna panels of the terminal device.

The processing module 802 is configured to determine a target codebook according to the number of antenna panels of the terminal device.

The sending module 803 is configured to send precoding indication (PMI) information to the terminal device, the PMI information being used to instruct the terminal device to transmit uplink signal by using a codeword in the target codebook.

In an embodiment, M codebooks are predetermined by the terminal device and the network device, each codebook corresponding to at least one number of antenna panels, and the processing module 802 is specifically configured to:

determine the target codebook corresponding to the number of antenna panels of the terminal device according to a mapping relationship between codebooks and numbers of antenna panels.

In an embodiment, a preset codebook is predetermined by the terminal device and the network device, and the processing module 802 is specifically configured to:

determine the target codebook from the preset codebook according to the number of antenna panels of the terminal device.

In an embodiment, when the number of antenna panels of the terminal device is greater than 1, the target codebook comprises an antenna panel selection codeword, the antenna panel selection codeword being used to select a target antenna panel for transmitting the uplink signal.

In an embodiment, the antenna panel selection codeword is a Kronecker product of an antenna panel selection vector and a precoding matrix within the antenna panel.

In an embodiment, the antenna panel selection codeword is a vector matrix comprising precoding matrices corresponding to W antenna panels as row vectors, W being an integer greater than 1.

In an embodiment, the antenna panel selection codeword is a vector matrix comprising L precoding vectors as column vectors, L being an integer greater than 1; and i-th column vector in the vector matrix is a Kronecker product of an antenna panel selection vector and a precoding vector used by an antenna panel for transmitting data of an i-th transmission layer, i being any number from 1 to L.

In an embodiment, the number of antenna panels of the terminal device is W, W being an integer greater than 1.

The receiving module 801 is further configured to receive channel sounding reference signal (SRS) transmitted by the terminal device through the W antenna panels respectively.

The processing module 802 is further configured to determine the PMI information according to the SRS.

It should be noted that each of the above modules (the receiving module 801, the processing module 802, and the sending module 803) may be used to perform related steps of the forgoing method.

In present embodiment, the network device 800 is presented in the form of modules. The term "module" herein may refer to an application-specific integrated circuit (ASIC), a processor that executes one or more software or firmware programs and memory, integrated logic circuits, and/or other devices that provide the forgoing functionality. In addition, the above processing module 802 may be implemented by the processor 1001 of the computer device shown in FIG. 10, and the receiving module 801 and the sending module 803 may be implemented by the transceiver 1003 of the computer device shown in FIG. 10.

Figure 9:
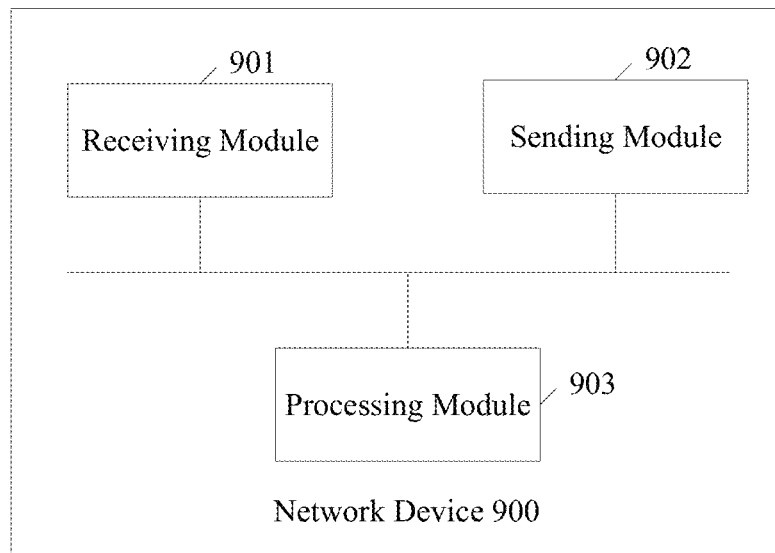
FIG. 9 is a block diagram illustrating a network device according to another embodiment of the disclosure.

Embodiments of the disclosure further provides a network device 900, as shown in FIG. 9, it may include a receiving module 901 and a sending module 902.

The receiving module 901 is configured to receive uplink signaling sent by a terminal device, the uplink signaling carrying a number of antenna panels of the terminal device.

The sending module 902 is configured to send antenna panel indication information to the terminal device, the antenna panel indication information being used to instruct the terminal device to determine, from antenna panels of the terminal device, a target antenna panel for transmitting uplink signal, and to transmit the uplink signal by using the target antenna panel.

In an embodiment, the sending module 902 is specifically configured to:

send to the terminal device high layer signaling or downlink control information (DCI) for scheduling uplink signal transmission, the high layer signaling or the DCI carrying the antenna panel indication information.

In an embodiment, the number of antenna panels of the terminal device is W, W being an integer greater than 1, And the receiving module 901 is further configured to receive channel sounding reference signal (SRS) transmitted by the terminal device through the W antenna panels respectively.

The network device may further include a processing module 903.

The processing module 903 is configured to determine the antenna panel indication information according to the SRS.

It should be noted that each of the above modules (the receiving module 901, the processing module 903, and the sending module 902) may be used to perform related steps of the forgoing method.

In the present embodiment, the network device 900 is presented in the form of modules. The term "module" herein may refer to an application-specific integrated circuit (ASIC), a processor that executes one or more software or firmware programs and memory, integrated logic circuits, and/or other devices that provide the forgoing functionality. In addition, the above processing module 903 may be implemented by the processor 1001 of the computer device shown in FIG. 10, and the receiving module 901 and the sending module 902 may be implemented by the transceiver 1003 of the computer device shown in FIG. 10

Figure 10:
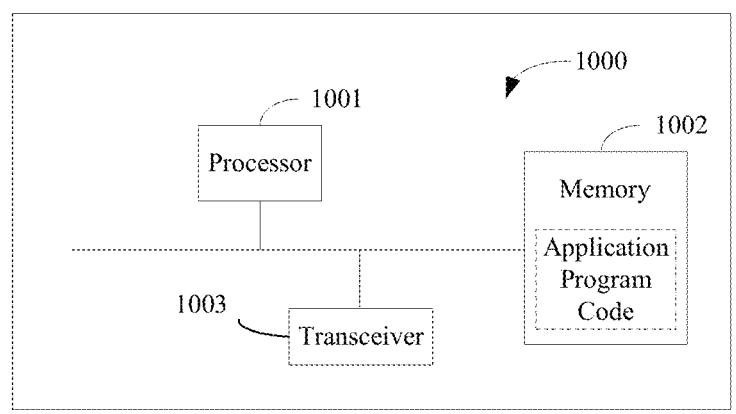
FIG. 10 is a block diagram illustrating a computer device according to an embodiment of the disclosure.

As shown in FIG. 10, the terminal device 600, the terminal device 700, the network device 800, and the network device 900 may be implemented in the structure of FIG. 10. The computer device 1000 includes at least one processor 1001, at least one memory 1002, and at least one transceiver 1003. The processor 1001 is in connection with the memory 1002 and the transceiver 1003 via the communication bus and completes communication with each other.

The processor 1001 may be a general purpose central processing unit (CPU), a microprocessor, an application-specific integrated circuit (ASIC), or one or more integrated circuits for controlling execution of the above program.

The transceiver 1003 is configured to communicate with other devices or communication networks, such as Ethernet, Radio Access Network (RAN), Wireless Local Area Networks (WLAN), and the like.

The memory 1002 may be a read-only memory (ROM) or other type of static storage device that can store static information and instructions, a random access memory (RAM) or other type of dynamic storage device that can store information and instructions. The memory may also be an Electrically Erasable Programmable Read-Only Memory (EEPROM), a Compact Disc Read-Only Memory (CD-ROM) or other optical disc storage, a disc storage device (including compact discs, laser discs, optical discs, digital versatile discs, Blue-ray discs, etc.), magnetic disk storage media or other magnetic storage devices, or any other media that can be used to carry or store desired program code in the form of instructions or data structures and can be accessed by a computer, but not limited thereto. The memory can exist independently and be connected to the processor via a bus. The memory can also be integrated with the processor.

The memory 1002 is configured to store application program code that executes the above solution, and is controlled by the processor 1001 for execution. The processor 1001 is configured to execute application program code stored in the memory 1002.

When the computer device shown in FIG. 10 is the terminal device 600, the code stored in the memory 1002 may be used to implement the uplink signal transmission method performed by the terminal device 600 as provided above, for example, the terminal device determines a target codebook according to the number of antenna panels of the terminal device; and transmits uplink signal by using a codeword in the target codebook.

When the computer device shown in FIG. 10 is the terminal device 700, the code stored in the memory 1002 may be used to implement the uplink signal transmission method performed by the terminal device 700 as provided above, for example, the terminal device sends uplink signaling to a network device, the uplink signaling carrying a number of antenna panels of the terminal device; receives antenna panel indication information sent by the network device; and determines a target antenna panel for transmitting uplink signal from an antenna panel of the terminal device according to the antenna panel indication information, and transmits the uplink signal by using the target antenna panel.

When the computer device shown in FIG. 10 is the network device 800, the code stored in the memory 1002 may be used to implement the uplink signal transmission method performed by the network device 800 as provided above, for example, the network device receives uplink signaling sent by a terminal device, the uplink signaling carrying a number of antenna panels of the terminal device; determines a target codebook according to the number of antenna panels of the terminal device; and sends precoding indication (PMI) information to the terminal device, the PMI information being used to instruct the terminal device to transmit uplink signal by using a codeword in the target codebook.

When the computer device shown in FIG. 10 is the network device 900, the code stored in the memory 1002 may be used to implement the uplink signal transmission method performed by the network device 900 as provided above, for example, the network device receives uplink signaling sent by a terminal device, the uplink signaling carrying a number of antenna panels of the terminal device; and sends antenna panel indication information to the terminal device, the antenna panel indication information being used to instruct the terminal device to determine, from antenna panels of the terminal device, a target antenna panel for transmitting uplink signal, and to transmit the uplink signal by using the target antenna panel.

Embodiments of the disclosure further provides a computer storage medium, the computer storage medium may store a program, and execution of the program may include some or all of the steps of any uplink signals transmission method as described in the foregoing method embodiments.

It should be noted that, for the foregoing method embodiments, for the sake of simple description, they are all expressed as a series of action combinations, but those skilled in the art should understand that the disclosure is not limited by the described action sequence. Because certain steps may be performed in other sequences or concurrently in accordance with the disclosure. In addition, those skilled in the art should also understand that the embodiments described in the specification are all preferred embodiments, and the actions and modules involved are not necessarily required by the disclosure.

In the above embodiments, the descriptions of the various embodiments are different, and the details that are not described in a certain embodiment may be referred to the related descriptions of other embodiments.

In the several embodiments provided herein, it should be understood that the disclosed device may be implemented in other ways. For example, the device embodiments described above are merely illustrative. For example, the division of modules is only a logical function division. In actual implementation, there may be another division manner, for example, multiple modules or components may be combined or integrate into another system, or some features may be ignored or not executed. In addition, mutual coupling or direct coupling or communication connection shown or discussed may be achieved through some interfaces, indirect coupling or communication connection between devices or modules may be electrical or otherwise.

The modules described as separate components may be or may not be physically separated, and the components displayed as modules may be or may not be physical modules, that is, may be located in the same place, or may be distributed to multiple network elements. Some or all of the modules may be selected according to actual needs to achieve the purpose of the solution of the embodiment.

In addition, each functional unit in each embodiment of the disclosure may be integrated into one processing unit, or each unit may exist physically separately, or two or more units may be integrated into one unit. The above integrated unit can be implemented in the form of hardware or in the form of a software functional unit.

The integrated unit, if implemented in the form of a software functional unit and sold or used as a standalone product, may be stored in a computer readable memory. Based on such understanding, the technical solution of the disclosure may contribute to the prior art or all or part of the technical solution may be embodied in the form of a software product stored in a memory. A number of instructions are included to cause a computer device (which may be a personal computer, server or network device, etc.) to perform all or part of the steps of the methods described in various embodiments of the disclosure. The foregoing memory includes: a U disk, a Read-Only Memory (ROM), a Random Access Memory (RAM), a removable hard disk, a magnetic disk, or an optical disk, and the like, which can store program codes.

Those skilled in the art can understand that all or part of the steps of the foregoing embodiments can be completed by a program to instruct related hardware, and the program can be stored in a computer readable memory, and the memory may include a flash drive, read-only memory (ROM), random access memory (RAM), disk, CD or the like.

The embodiments of the disclosure have been described in detail as above, and principles and implementations of the disclosure are described in detail herein with reference to some specific examples. However, the description of forgoing embodiments is only for helping to understand the method of the disclosure and its core concept. Meanwhile, both the implementations and application scope may be modified by those skilled in the art based on the concept. Accordingly, the disclosure of this specification is not to be construed as limiting the present invention.

What is claimed is:

1. An uplink signal transmission method, comprising:
   determining, by a terminal device, a target codebook according to a number of antenna panels of the terminal device; and
   transmitting, by the terminal device, uplink signal by using a codeword in the target codebook;
   wherein the number of antenna panels of the terminal device is W, where W being an integer greater than 1, and the method further comprises:
   transmitting, by the terminal device, channel sounding reference signal (SRS) through the W antenna panels, respectively, at different time points, the SRS being used by a network device to determine precoding indication (PMI) information.

2. The method of claim 1, wherein, prior to the determining, by a terminal device, a target codebook according to a number of antenna panels of the terminal device, the method further comprises:
   sending, by the terminal device, uplink signaling to the network device, the uplink signaling carrying the number of antenna panels of the terminal device, and the number of antenna panels of the terminal device being used by the network device to determine the target codebook.

3. The method of claim 1, wherein M codebooks are predetermined by the terminal device and the network device, each codebook corresponding to at least one number of antenna panels, where M being an integer greater than 1, and the determining, by a terminal device, a target codebook according to a number of antenna panels of the terminal device comprises:
   determining, by the terminal device, the target codebook corresponding to the number of antenna panels of the terminal device according to a mapping relationship between codebooks and numbers of antenna panels.

4. The method of claim 1, wherein a preset codebook is predetermined by the terminal device and the network device, the determining, by a terminal device, a target codebook according to a number of antenna panels of the terminal device comprises:
   determining, by the terminal device, the target codebook from the preset codebook according to the number of antenna panels of the terminal device.

5. The method of claim 1, wherein the target codebook comprises an antenna panel selection codeword, the antenna panel selection codeword being used to select a target antenna panel for transmitting the uplink signal.

6. The method of claim 5, wherein the antenna panel selection codeword is a Kronecker product of an antenna panel selection vector and a precoding matrix within the antenna panel.

7. The method of claim 5, wherein the antenna panel selection codeword is a vector matrix comprising precoding matrices corresponding to W antenna panels as row vectors, W being an integer greater than 1.

8. The method of claim 5, wherein the antenna panel selection codeword is a vector matrix comprising L precoding vectors as column vectors, L being an integer greater than 1; and i-th column vector in the vector matrix is a Kronecker product of an antenna panel selection vector and a precoding vector used by an antenna panel for transmitting data of an i-th transmission layer, i being any number from 1 to L.

9. The method of claim 1, wherein the method further comprises:
receiving, by the terminal device, the PMI information sent by the network device;
the transmitting, by the terminal device, uplink signal by using a codeword in the target codebook comprises:
determining, by the terminal device, a target codeword in the target codebook according to the PMI information; and
precoding, by the terminal device, the uplink signal based on the target codeword, and transmitting the precoded uplink signal.

10. An uplink signal transmission method, comprising:
sending, by a terminal device, uplink signaling to a network device, the uplink signaling carrying a number of antenna panels of the terminal device;
receiving, by the terminal device, antenna panel indication information sent by the network device; and
determining, by the terminal device, a target antenna panel for transmitting uplink signal from an antenna panel of the terminal device according to the antenna panel indication information, and transmitting the uplink signal by using the target antenna panel;
wherein the number of antenna panels of the terminal device is W, W being an integer greater than 1, and prior to the receiving, by the terminal device, antenna panel indication information sent by the network device, the method further comprises:
transmitting, by the terminal device, channel sounding reference signal (SRS) through the W antenna panels respectively, the SRS being used by the network device to determine the antenna panel indication information;
wherein the transmitting, by the terminal device, SRS through the W antenna panels respectively comprises:
transmitting, by the terminal device, SRS through the W antenna panels, respectively, at different time points.

11. The method of claim 10, wherein the receiving, by the terminal device, antenna panel indication information sent by the network device comprises:
receiving, by the terminal device, high layer signaling or downlink control information (DCI) for scheduling uplink signal transmission sent by the network device, the high layer signaling or the DCI carrying the antenna panel indication information.

12. A terminal device, comprising a processor, a memory, a transceiver, and a bus;
the processor is in connection and communication with the memory and the transceiver through the bus;
the memory stores executable program instructions; and
the processor is configured to execute the executable program instructions in the memory, and when the executable program instructions is executed, the processor is configured to:
control the transceiver to send uplink signaling to a network device, the uplink signaling carrying a number of antenna panels of the terminal device;
control the transceiver to receive antenna panel indication information sent by the network device; and
determine a target antenna panel for transmitting uplink signal from an antenna panel of the terminal device according to the antenna panel indication information, and control the transceiver to transmit the uplink signal by using the target antenna panel;
wherein the number of antenna panels of the terminal device is W, W being an integer greater than 1, and the processor is further configured to:
control the transceiver to transmit channel sounding reference signal (SRS) through the W antenna panels respectively, the SRS being used by the network device to determine the antenna panel indication information;
wherein the processor configured to transmit SRS through the W antenna panels respectively is configured to: control the transceiver to transmit SRS through the W antenna panels, respectively, at different time points.

13. The terminal device of claim 12, wherein the processor configured to receive antenna panel indication information sent by the network device is configured to:
control the transceiver to receive high layer signaling or downlink control information (DCI) for scheduling uplink signal transmission sent by the network device, the high layer signaling or the DCI carrying the antenna panel indication information.

* * * * *